United States Patent [19]

Swidwa et al.

[11] Patent Number: 4,904,442
[45] Date of Patent: Feb. 27, 1990

[54] PERMANENT CAVITY SEAL RING FOR A NUCLEAR REACTOR CONTAINMENT ARRANGEMENT

[75] Inventors: Kenneth J. Swidwa, N. Versailles; Robert B. Salton, Plum Borough; James R. Marshall, Penn Hills, all of Pa.

[73] Assignee: Westinghouse Electric Corp., Pittsburgh, Pa.

[21] Appl. No.: 270,878

[22] Filed: Nov. 14, 1988

[51] Int. Cl.[4] .................... G21C 19/00; G21C 11/00
[52] U.S. Cl. .................................. 376/203; 376/260; 376/263; 376/287
[58] Field of Search ............... 376/203, 205, 287, 260, 376/262, 263

[56] References Cited

U.S. PATENT DOCUMENTS

| | | | |
|---|---|---|---|
| 3,633,784 | 1/1972 | Taft et al. | 376/203 |
| 3,812,008 | 5/1974 | Fryer | 176/30 |
| 4,001,079 | 1/1977 | Rylaff | 376/203 |
| 4,070,221 | 1/1978 | Anthony | 156/245 |
| 4,126,515 | 11/1978 | Klotz et al. | 376/287 |
| 4,170,517 | 10/1979 | Meuschke et al. | 176/87 |
| 4,214,760 | 7/1980 | Godfrey | 277/34.3 |
| 4,584,163 | 4/1986 | Hankinson | 376/205 |
| 4,650,643 | 3/1987 | Anthony | 376/287 |
| 4,747,993 | 5/1988 | Hankinson et al. | 376/205 |
| 4,753,768 | 6/1988 | Puri | 376/203 |
| 4,758,402 | 7/1988 | Schukei et al. | 376/205 |

Primary Examiner—Harvey E. Behrend
Attorney, Agent, or Firm—M. G. Panian

[57] ABSTRACT

A nuclear reactor containment arrangement has a permanent cavity ring seal extending across an annular expansion gap between a reactor pressure vessel and a containment wall to provide a water tight seal therebetween. The annular ring seal has a support ring with an inner downwardly extending cylindrical section resting on the reactor flange and an outer downwardly extending cylindrical section resting on a shelf in the containment wall. A vertically extending, L-shaped, seal extends between an inner end of the support ring while a vertically extending, L-shaped, seal extends between the outer cylindrical section and the containment wall shelf. Neutron shielding material is suspended, by support rods, within the annular expansion gap while thermal insulation is provided therebelow. Manways and ports in the support ring are sealed by hatches and provide access to the annular expansion gap and, while open, provide for flow of cooling air from the annular expansion gap through the support ring.

18 Claims, 3 Drawing Sheets

PERMANENT CAVITY SEAL RING FOR A NUCLEAR REACTOR CONTAINMENT ARRANGEMENT

CROSS-REFERENCE TO RELATED APPLICATION

This application is related to application Ser. No. 270,879, filed on even date herewith in the names of the present inventors, entitled "Nuclear Reactor Containment Arrangement with Permanent Cavity Seal Ring", which application is assigned to the assignee of the present invention.

BACKGROUND OF THE INVENTION

This invention relates to a nuclear reactor containment arrangement wherein a permanent cavity seal ring extends across an annular expansion gap between a reactor pressure vessel and a containment wall to provide a water tight seal therebetween.

A nuclear reactor pressure vessel is typically positioned in a cavity or containment system formed of concrete and shielding material. The reactor pressure vessel is spaced from the containment wall so as to provide an annular expansion gap and permit the vessel to expand in both a horizontal and vertical direction. An upper annular portion above the vessel serves as a refueling canal. The refueling canal, while maintained dry during reactor operation, is filled with water during refueling of the nuclear reactor. In refueling, the head of the reactor pressure vessel is removed and the refueling canal is filled with borated water and provides adequate shielding in order to maintain radiation levels within acceptable limits.

The reactor pressure vessel has flanges which secure the head assembly to the body of the vessel, with a lower flange on the peripheral wall of the vessel ear the vessel opening that is sealable to the containment wall. The seal between the reactor pressure vessel and the containment wall serves as a floor for the body of water that is placed in the refueling canal.

It has previously been proposed to use removable seals to seal the vessel to the containment wall, such as removable gasket-type seal rings, but such elastomeric gaskets are susceptible to degradation and leakage and require inordinate installation time and effort.

During normal reactor operation with a removable seal, the annular expansion gap between the reactor pressure vessel and the containment wall is covered with portable thermal insulation and a large ring-shaped water tank for neutron shielding. These large components must be removed for refueling operations and later reinstalled. Since the concrete structure of the containment wall, on the outside of the annular expansion gap, must be kept below design temperature limits, cooling air is forced up between the face of the concrete liner in the cavity and out through openings in the supports of the neutron shield tanks during operation of the reactor. In addition, any personnel access for instrumentation service and reactor vessel nozzle inspection is normally only available during the period when all of the hardware is removed from the top of the annular expansion gap, i.e. the removable seal, shielding and insulation.

In order to solve the problems associated with temporary or removable seals, the installation of permanent seals, such as that described in U.S. Pat. No. 4,747,993, to Meuschke et al., assigned to the assignee of the present invention, and the contents of which are incorporated by reference herein, were developed. The permanent seal ring described in U.S. Pat. No. 4,747,993 has an annular ring plate which is formed as a step-shaped cross-section, having a first annular portion that is fixed to a mounting plate on the containment wall, a cylindrical portion, and a second annular portion which extends horizontally past, and is spaced from, the outer edge of the flange on the reactor pressure vessel. An L-shaped flexure member is affixed to the second annular portion and has one leg thereof secured to the second annular portion and the other leg which extends to and sealingly engages the flange. The U.S. Pat. No. 4,747,993 type of permanent sealing ring, while having superior properties over prior art rings, is designed to have a backup member, in addition to the sealing flexure member, in the event that the seal between the other leg and the flange is disturbed by deflective or other forces. This backup member, which is a backup plate and flashing, provides a backup structure for the flexure member to preclude the possibility of major leakage of shielding water in the event of structural failure of the flexural member. While the backup member does not form a water-tight seal it does function as a flow restrictor to prevent a catastrophically sudden and/or complete loss of shielding water from the refueling canal during refueling operations. The support arms of this annular ring seal also use leveling bolts which engage the flange for initially aligning the ring during installation and providing auxiliary support for the annular ring seal during the refueling operation.

It is an object of the present invention to provide a permanent cavity seal ring for a nuclear reactor containment arrangement as a single structure which results in water-tight sealing, neutron shielding, thermal insulation, containment wall cooling and service access to the annular expansion gap.

SUMMARY OF THE INVENTION

With this object in view, the present invention provides an annular ring seal that extends across the annular expansion gap between a reactor pressure vessel, the vessel having a peripheral wall and a horizontally extending flange, and a containment wall spaced from the peripheral wall of the vessel to define the annular expansion gap. The annular ring seal has a support ring with radially inwardly and outwardly disposed ends, the support ring having inner and outer downwardly extending cylindrical sections. The inner cylindrical section is spaced from the radially inwardly disposed end of the support ring and rests on the horizontally outwardly extending flange of the reactor pressure vessel while the outer cylindrical section rests on the shelf of the containment wall.

A vertically extending, L-shaped, flexible inner seal extends between the radially inwardly disposed end of the support ring, the leg of the seal flush with the upper surface of the horizontally extending flange on the reactor vessel to seal the space between the radially inwardly disposed end and the horizontally extending flange, while a vertically extending, L-shaped, flexible outer seal extends between the outer cylindrical section of the support ring. The leg of the seal flush with a mating plate on the shelf of the containment wall, to seal the space between the outer cylindrical section of the support ring and the mating plate.

Radial support beams extend between the inner and outer cylindrical sections of the support ring and carry support rods that extend downwardly therefrom and support neutron shielding material within the annular expansion gap.

The support ring has manway access hatches and detection well hatches therein and removable plugs of the neutron shielding material are provided to provide access to the region of the annular expansion gap therebelow. Thermal insulation is provided below the neutron shields that directs air from below upwardly around the neutron shields and outwardly through the manway access hatches and detection well hatches which are open during normal operation of the reactor.

BRIEF DESCRIPTION OF THE DRAWINGS

The invention will become more readily apparent from the following description of a preferred embodiment thereof shown, by way of example only, in the accompanying drawings, wherein.

DETAILED DESCRIPTION

Figure 1:
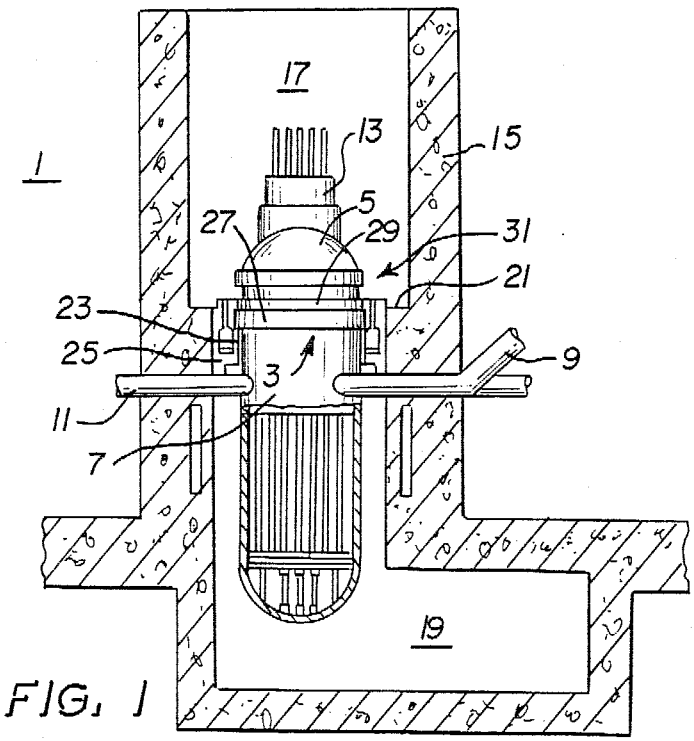
FIG. 1 is an elevational view partly in cross-section of a reactor containment arrangement incorporating a permanent cavity seal ring according to the present invention.

Referring now to FIG. 1, a nuclear reactor containment arrangement 1 according to the present invention is illustrated wherein a nuclear reactor pressure vessel 3 has a removable head portion 5 and body portion 7. The reactor pressure vessel 3 has a coolant flow inlet means 9 and coolant flow outlet means 11 formed integrally with and through the cylindrical wall of the body portion 7. The reactor pressure vessel 3 contains a nuclear core (not shown) which has a plurality of nuclear fuel elements which generate heat depending primarily on the position of control means, the pressure vessel housing 13 of which is shown. The heat generated by the reactor core is conveyed from the core by coolant flow entering through inlet means 9 and exiting through outlet means 11, as is conventional and known in the art.

The reactor pressure vessel with its head assembly is maintained within a reactor cavity defined by a concrete containment wall 15 which is divided into an upper portion or refueling canal 17 and a lower portion or well 19 which contains the body portion 7 of the reactor pressure vessel 3. A shelf 21 is provided in the containment wall 15 which divides the upper portion or refueling canal 17 from the lower portion or well 19 of the reactor cavity.

Between the peripheral wall 23 of body portion 7 of the reactor pressure vessel 3 and the containment wall 15 there is provided an annular expansion gap 25 which is to accommodate for thermal expansion and contraction of the reactor pressure vessel 3 during cyclic operation of the reactor. The peripheral wall 23 of the body portion 7 of pressure vessel 3 has a horizontally outwardly extending flange 27 thereon, while an upper flange 29 is also provided on the head portion 5, which head portion is removed during the refueling operation.

An annular ring seal 31 is provided which accommodates for normal thermal expansion and contraction of the reactor vessel 3 during operation of the reactor while also sealing off the refueling canal 17 from the well 9 of the reactor cavity. The purpose of the annular ring seal 31 is to prevent water, which is used to flood the refueling canal 17 during refueling operations, from entering the lower portion or well 19 of the cavity.

Figure 2:
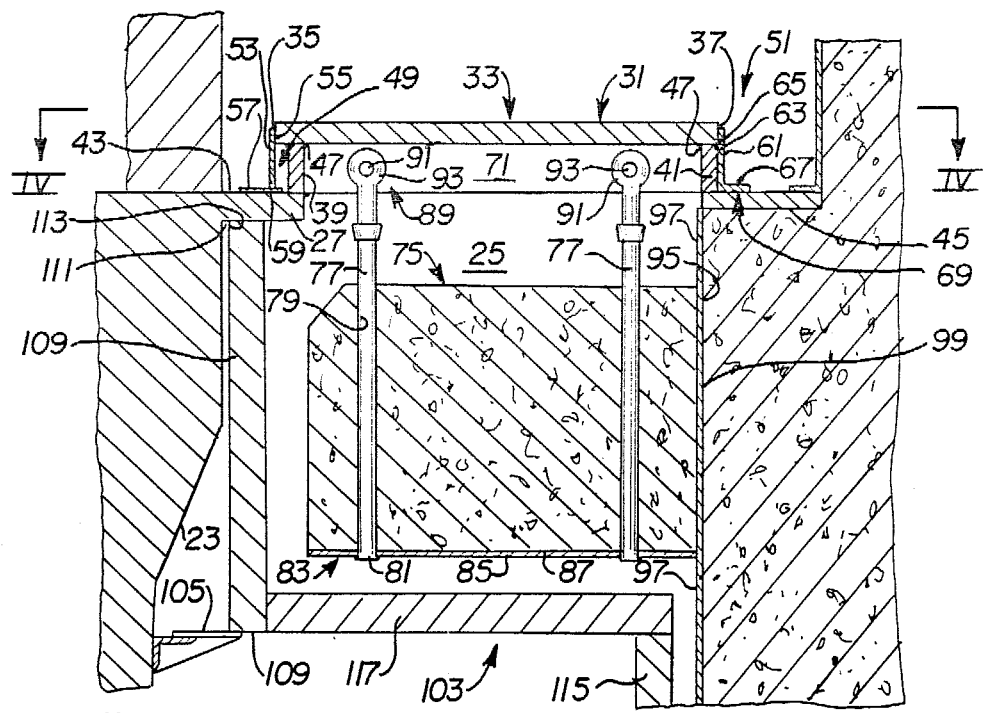
FIG. 2 is an enlarged cross-sectional view of a portion of the permanent cavity seal ring of the present invention.

The annular ring seal 31, as illustrated by reference to FIG. 2, has a support ring 33, which extends across the annular expansion gap 25, having a radially inwardly disposed end 35 and a radially outwardly disposed end 37, an inner downwardly extending cylindrical section 39 and an outer downwardly extending cylindrical section 41. The inner downwardly extending cylindrical section 39, as shown, is spaced from the radially inwardly disposed end 35 of the support ring 33.

The support ring 33 is disposed such that the inner downwardly extending cylindrical section 39 rests on the upper surface 43 of the horizontally outwardly extending flange 27 on the reactor pressure vessel 3, while the outer downwardly extending cylindrical section 41 rests on the shelf 21 in the containment wall 15, which shelf has a mating plate 4 thereon, the support ring 33 resting thereon by means of gravity. The inner and outer downwardly extending cylindrical sections 39 and 41 are fixed to the support ring 33, such as by welds 47, but are not themselves fixed to the surface 43 or shelf 21.

A vertically extending, L-shaped, flexible inner seal 49 and vertically extending, L-shaped, flexible outer seal 51 are provided on the annular ring seal. The seal 49 is of L-shaped construction, with the upper end 53 thereof secured to the radially inwardly disposed end 35 of support ring 33, such as by welds 55, while the leg 57 of the seal 49, extending inwardly towards the pressure vessel wall, is secured to the upper surface 43 of the horizontally outwardly extending flange 21 of the reactor pressure vessel 3, such as by welds 59.

The vertically extending, L-shaped, flexible outer seal 51 has an upper end 61 which is secured to the surface 63 of the outer downwardly extending cylindrical section 41 of the annular ring seal 31, such as by welds 65, and a leg 67 which is secured to the shelf 21, such as by welds 69 between the leg 67 and the mating plate 45 on shelf 21 in the containment wall 15. The vertically extending, L-shaped, flexible inner seal 49 and vertically extending, L-shaped, flexible outer seal 51 may be shop welded to the radially inwardly disposed end 35 of support ring 33 and the surface 63 of the outer downwardly extending cylindrical section 41, respectively, of the annular sealing ring 31, and field welded to the horizontally outwardly extending flange 27 and mating plate 45, respectively. As can be seen by the drawings, the configuration of the inner and outer seals is such that no catastrophic failure is possible under a head of water, such that redundant passive seals are not required to preclude draining of the refueling canal water pool. The worst cast situation would be leakage from a cracked seal weld, which would be insignificantly affected by any second passive or redundant seal.

A plurality of radial support beams 71 are secured to the support ring 33 and extend between the inner and outer downwardly extending cylindrical sections 39 and 41 to reinforce the same and provide support for neutron shielding material as explained hereinafter.

Although sized to do so, the inner and outer seals 49, 51 and their welds 55, 59, 65 and 69 are not the primary support for the weight of water in the refueling canal on the support ring 33. They are provided primarily to seal against water leakage and handle differential motion of the surfaces caused by thermal or seismic events. The inner and outer downwardly extending cylindrical sections 39 and 41 rest on the horizontally extending flange 29 and shelf 21, respectively, to provide the primary support for such a load.

Figure 3:
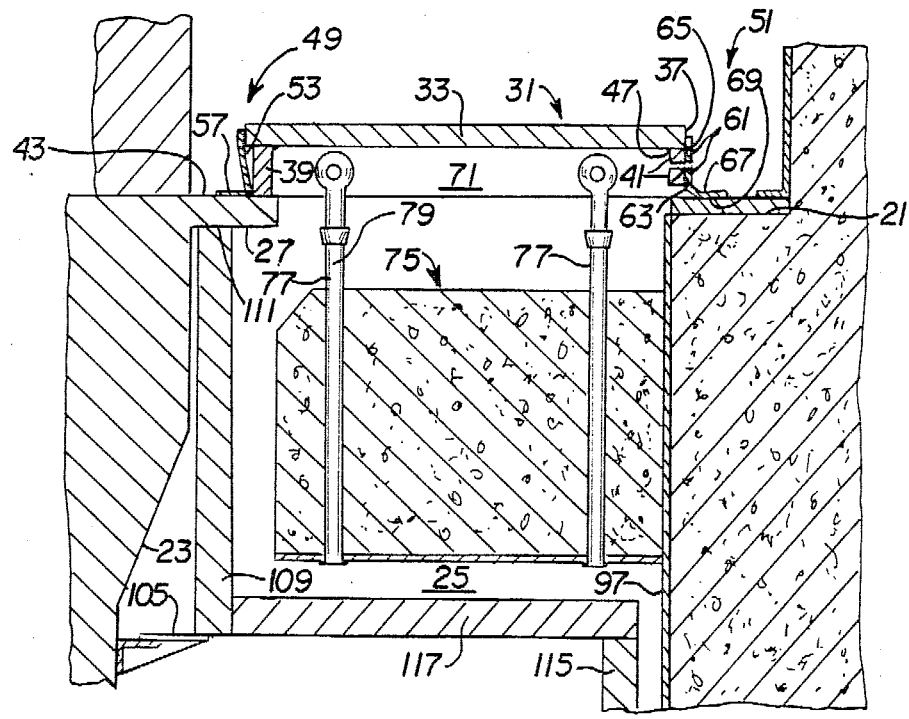
FIG. 3 is a view similar to that of FIG. 2 showing the deflected configuration of the vertically extending, L-shaped, flexible inner seal and the vertically extending, L-shaped, flexible outer seal of the permanent cavity seal ring.

As illustrated in FIG. 3, the vertically extending, L-shaped, flexible inner seal 49 compensates for radial expansion of the reactor pressure vessel 3, while the vertically extending, L-shaped, flexible outer seal 51 compensates for vertical expansion of the reactor pressure vessel 3.

Figure 4:
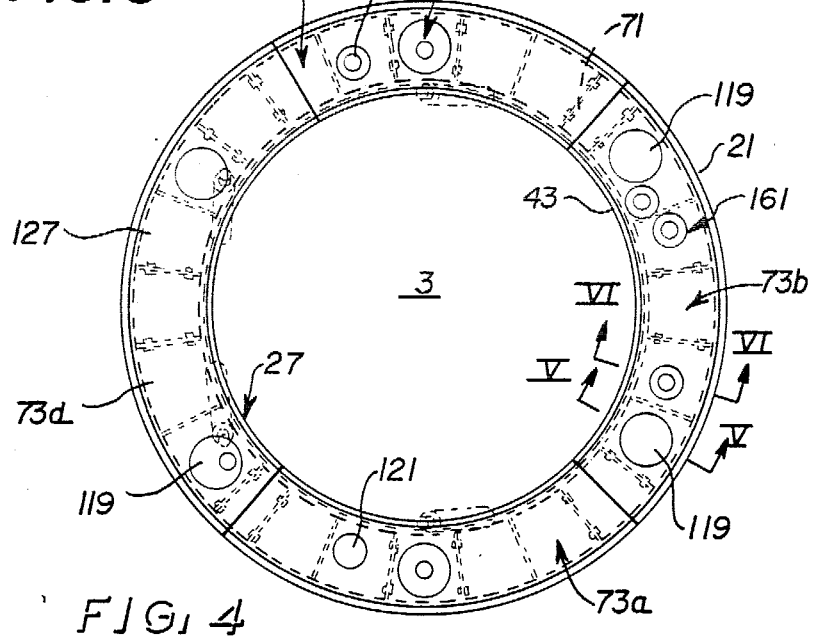
FIG. 4 is a cross-sectional plan view of the reactor containment arrangement incorporating the cavity seal ring of FIG. 2 as viewed through section IV—IV thereof.

The annular seal ring 31, as illustrated in FIG. 4 is provided in a plurality of arcuate segments 73, such as four arcuate segments 73a, 73b, 73c and 73d. The arcuate segments 73 are splice welded together after installation of the annular seal ring on the site.

Each of the arcuate segments 73 incorporate neutron shielding material suspended in the annular expansion gap 25. The neutron shields 75, in the form of arcuate blocks of a neutron shielding material, are suspended from the radial support beams 71 by downwardly depending support rods 77. The support rods 77 pass through apertures 79 in the neutron shields 75 (FIG. 3) and have a shoulder 81 about the bottom end 83 thereof upon which the neutron shields rest. A metallic skin 85 may be provided on the lower surface 87 of the neutron shields to reinforce the same. The upper end 89 of the support rods 77 have a clevis 91 thereon which coacts with a pin 93 on the radial support beams 71 to support the same in a downwardly depending manner. The outer periphery 95 of the neutron shield 75 is abutted against a conventional liner 97 about the inner periphery 99 of the containment wall 15. The arcuate segments 73 of annular seal ring 31 with the neutron shields 75 can be installed in place vertically without tipping or rotating.

The neutron shields 75 are formed from a heat resistant type of neutron shielding material of cementitious properties. It may be supplied either in powdered form to which water is added on site or it may be supplied as precast blocks. Due to possible shipping damage to precast blocks, it is preferred that the shielding material be mixed on site in steel support trays used for mounting and installation. Such formation of the neutron shield blocks would be done outside the containment structure several days before installation is to take place.

As is conventional, thermal insulation is provided about the pressure vessel 3 between the peripheral wall 23 thereof and the metal liner 97 on the inner periphery 99 of the wall 15. The thermal insulation 103 in the present construction is installed in a manner that allows placement of the neutron barrier 75, with access to monitoring devices and so as to permit cooling flow of air through the annular expansion gap 25. A platform 105 is fixed to the peripheral wall 23 of the reactor pressure vessel in the expansion gap 25 vertically spaced below the horizontally outwardly extending flange 27. An upward vertical section 107 of thermal insulation 103 extends downwardly from the horizontally outwardly extending flange 27 and has a lower end 109 which rests on the platform 105 and an upper end which terminates at 111, in contact with the lower surface 113 of the flange 27. A lower vertical section 115 of thermal insulation 103 is radially outwardly spaced and disposed below the upper vertical section 107, with a horizontally extending connecting section 117 provided, which connects upper section 107 and lower section 115.

Figure 5:
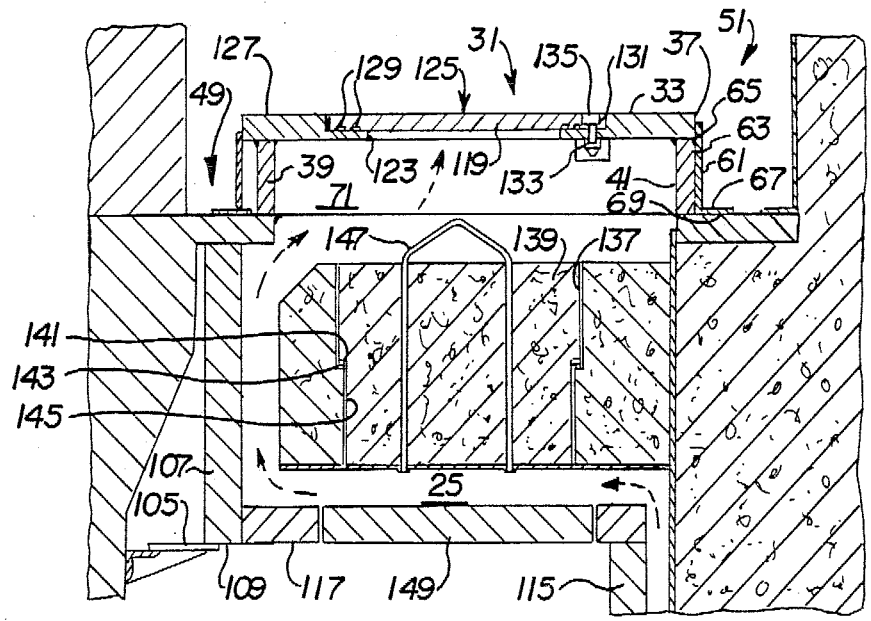
FIG. 5 is an elevational cross-sectional view of the reactor containment arrangement through a manway hatch, taken along lines V—V of FIG. 4.
Figure 6:
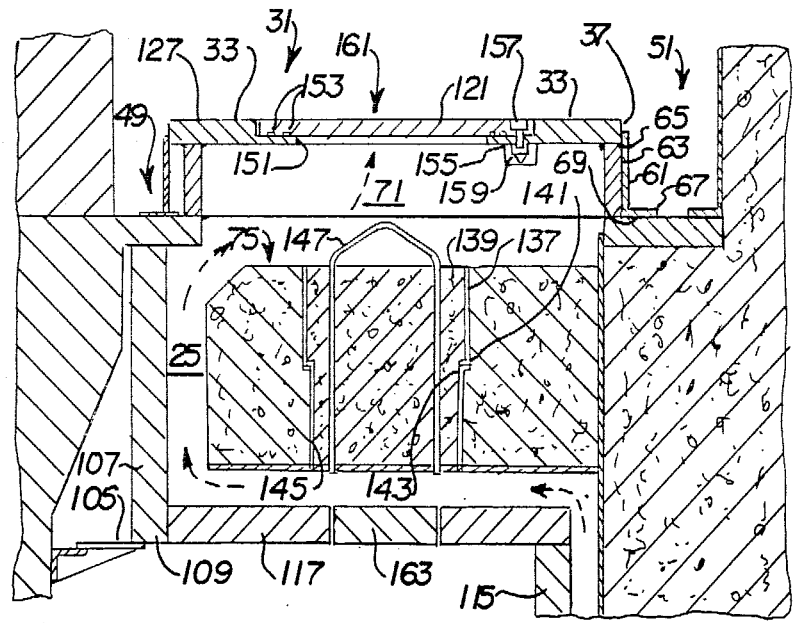
FIG. 6 is an elevational cross-sectional view through an instrumentation access hatch, taken along lines VI—VI of FIG. 4.

Means for providing access to the annular expansion gap 25 below the annular sealing ring 31 are provided, and are best illustrated in FIGS. 5 and 6. For the purpose of inspection or monitoring, manway access hatches 119 and detection well hatches 121 are provided in the support ring 33. The manway access hatches 119, six of which are shown in FIG. 4, cover manways 123 and are recessed such that the upper surface 125 of the manway access hatches 119 is flush with the upper surface 127 of the support ring 33. The manway access hatches 119 are sealed by double seals 129, which are testable for leakage, and secured in place by bolts 131, which engage with threaded bores 133 and have recessed heads 135, to provide an unobstructed working surface on the annular seal ring 31.

A section of the neutron shield 75 is cut out of the shield, to form a plug hole 137 and a removable plug 139 of the neutron shielding material used to fill the plug hole. A shoulder 141 on the removable plug 139 rests on a cooperating shoulder 143 in the wall 145 of the plug hole 137. A lifting bail 147 is provided secured in the plug 139. Immediately below the plug 139, a removable door 149 is formed in the horizontally connecting section 117 of thermal insulation 103. The detection well hatches 121, five of which are shown in FIG. 4, are for service access to detector instrumentation, and cover access ports 151 in the support ring 33. The detection well hatches 121 are secured to the support ring 33 in a manner similar to that of the manway hatches 119, the hatches 121 being recessed in the support ring 33 and having double seals 153 and bolts 155, having recessed heads 157, engaging in threaded bores 159, with the upper surface 161 of the detection well hatches flush with the upper surface 127 of he support ring 33. As is formed below the manway hatches 119, below the detection well hatches 121 there is provided a plug hole 137 and removable plug 139 of neutron shielding material, with shoulders 141 and 143 and a lifting bail 147. A removable door 163 is also provided in the horizontally connecting section 117 of thermal insulation 103 below the removable plug 139 disposed beneath the detection well hatch 121.

By providing the thermal insulation 103 in the configuration of the present invention, the insulation directs the flow path of the cooling air, during reactor operation, from below the nozzles and up along the open annulus between the lower section 115 and the metal liner 97, radially inward under the neutron shields 75 and then upwardly on the inside of the shield 75. The cooling air then moves radially outwardly, as illustrated by the dashed arrows shown in FIGS. 5 and 6, above the neutron shield 75 and exits into the cavity 15 above the annular sealing ring 31 through the manway access hatches 119 and the detection well hatches 121 which are kept open during the reactor operation. The flow area provided by the open hatches 119, 121 is greater than the flow area through the cavity annulus between the lower section 115 and metal liner 97. This arrangement provides a cooling air outlet area which is larger than some existing designs. This cooling air flow and insulation arrangement optimizes the cooling affect on the upper section of the containment wall and on the neutron shield. In one arrangement, the spacing between the lower section 115 and metal liner 97 would be about 5.08 cm (2 inches), with six manway access hatches 119 provided of an inside diameter of about 50.8 cm. (20 inches) and five detection well hatches 121 provided of an inside diameter of about 24.13 cm. (9.5 inches).

What is claimed is:

1. A nuclear reactor containment arrangement including:
   a reactor pressure vessel which thermally expands and contracts during cyclic operation of the reactor, the vessel having a peripheral wall and a horizontally outwardly extending flange thereon;
   a containment wall having a shelf, said wall spaced from and surrounding the peripheral wall of the reactor pressure vessel defining an annular expansion gap therebetween, and
   an annular ring seal extending across said annular expansion gap to provide a water-tight seal therebetween, which annular ring seal comprises:
   a support ring having radially inwardly and outwardly disposed ends, extending across said annular expansion gap, said support ring having inner and outer downwardly extending cylindrical sections, said inner cylindrical section spaced from said radially inwardly disposed end and resting on the horizontally outwardly extending flange of the reactor pressure vessel, and said outer cylindrical section resting on the shelf of the containment wall;
   a vertically extending, L-shaped, flexible inner seal, extending between the radially inwardly disposed end of said support ring, with the leg thereof flush with said horizontally extending flange sealing the space between said radially inwardly disposed end and said horizontally extending flange; and
   a vertically extending, L-shaped, flexible outer seal extending between said outer cylindrical section and the shelf of said containment wall, sealing the space between said outer cylindrical section and said shelf.

2. The nuclear reactor containment arrangement as defined in claim 1 wherein a plurality of radial support beams are secured to said support ring and extend between said inner and outer cylindrical sections.

3. The nuclear reactor containment arrangement as defined in claim 2 wherein said support beams have support rods depending downwardly therefrom within said annular expansion gap and neutron shielding material is provided in said gap supported by said rods.

4. The nuclear reactor containment arrangement as defined in claim 3 wherein said annular ring seal is provided in a plurality of arcuate segments which are welded together after installation thereof.

5. The nuclear reactor containment arrangement as defined in claim 3 wherein said neutron shielding material is in the form of arcuate blocks of a neutron shielding material having a metal skin provided on the lower surface thereof, said support rods extend through the neutron shielding material and metal skin, and said rods have a shoulder about the bottom end upon which said neutron shielding material rests by gravitational forces.

6. The nuclear reactor containment arrangement as defined in claim 5 wherein the outer periphery of the neutron shield is abutted against a metal liner on the inner periphery of the containment wall.

7. The nuclear reactor containment arrangement as defined in claim 6 wherein said support ring has at least one manway therein, and a sealable access hatch is provided to close the manway.

8. The nuclear reactor containment arrangement as defined in claim 7 wherein a removable plug of neutron shielding material is provided in said neutron shield beneath said manway.

9. The nuclear reactor containment arrangement as defined in claim 8 wherein said support ring has at least one detection well port therein, with a sealable detection well hatch provided to close the port, and a removable plug of neutron shielding material is provided in said neutron shield beneath said port.

10. The nuclear reactor containment arrangement as defined in claim 6 wherein thermal insulation is provided in said annular expansion gap, including an upper vertical section extending downwardly from the horizontally outwardly extending flange of the reactor pressure vessel, a lower vertical section radially outwardly spaced and disposed below the upper vertical section, and a horizontally extending connecting section which connects said upper and lower sections.

11. The nuclear reactor containment arrangement as defined in claim 10 wherein said upper vertical section of thermal insulation has a lower end, and a platform is fixed to the peripheral wall of said reactor pressure vessel, upon which said lower end rests.

12. The nuclear reactor containment arrangement as defined in claim 11 wherein said upper vertical section of thermal insulation has an upper end in contact with said horizontally outwardly extending flange on said reactor pressure vessel.

13. The nuclear reactor containment arrangement as defined in claim 12 wherein said support ring has at least one manway and a sealable access hatch is provided to close said manway, and whereby when said access hatch is open, air directed upwardly through said annular expansion gap is directed through said manway.

14. The nuclear reactor containment arrangement as defined in claim 13 wherein said support ring has at least one detection well port therein, with a sealable detection well hatch provided to close the port, and whereby when said detection well hatch is open, air directed upwardly through said annular expansion gap is directed through said port.

15. A nuclear reactor containment arrangement including:
   a reactor pressure vessel which thermally expands and contracts during cyclic operation of the reactor, the vessel having a peripheral wall and a horizontally outwardly extending flange thereon;
   a containment wall having a shelf, said wall spaced from and surrounding the peripheral wall of the reactor pressure vessel defining an annular expansion gap therebetween, and
   an annular ring seal extending across said annular expansion gap to provide a water-tight seal therebetween, which annular ring seal comprises:
   a support ring, having radially inwardly and outwardly disposed ends, extending across said annular expansion gap, said support ring having inner and outer downwardly extending cylindrical sections, said inner cylindrical section spaced from said radially inwardly disposed end and resting on the horizontally outwardly extending flange of the reactor pressure vessel, said outer cylindrical section resting on the shelf of the containment wall, and a plurality of radial support beams secured to said support ring and extending between said inner and outer cylindrical sections;

support rods depending downwardly from said support beams within said annular expansion gap;

neutron shielding material provided in said annular expansion gap supported by said support rods;

a vertically extending, L-shaped, flexible inner seal, extending between the radially inwardly disposed end of said support ring, with the leg thereof flush with said horizontally extending flange sealing the space between said radially inwardly disposed end and said horizontally extending flange; and a vertically extending, L-shaped, flexible outer seal extending between said outer cylindrical section and the shelf of said containment wall, sealing the space between said outer cylindrical section and said shelf.

16. The nuclear reactor containment arrangement as defined in claim 15 wherein said neutron shielding material is in the form of arcuate blocks of a neutron shielding material having a metal skin provided on the lower surface thereof, said support rods extend through the neutron shielding material and metal skin, and said rods have a shoulder about the bottom end upon which said neutron shielding material rests by gravitational forces, and a metal liner is provided on the inner periphery of the containment wall, with the outer periphery of said neutron shielding material abutted against said metal liner.

17. The nuclear reactor containment arrangement as defined in claim 16 wherein at least one manway having a sealable access hatch and at least one detection wall port having a detection well hatch are provided in said support ring and a removable plug of neutron shielding material is provided in said neutron shielding material beneath each said manway and said detection well hatch.

18. The nuclear reactor containment arrangement as defined in claim 17 wherein thermal insulation is provided in said annular expansion gap, including an upper vertical section in contact with and extending downwardly from the horizontally outwardly extending flange of the reactor pressure vessel, a lower vertical section radially outwardly spaced and disposed below the upper vertical section, and a horizontally extending connecting section which connects said upper and lower sections, whereby when said access hatch and said detection well hatches are open air is directed through said annular expansion gap through said manway and said port.

* * * * *